(12) United States Patent
Hoff et al.

(10) Patent No.: US 12,137,702 B2
(45) Date of Patent: Nov. 12, 2024

(54) PRINT HEAD FOR PRINTING A FOOD PRODUCT LAYER-BY-LAYER AND A SYSTEM COMPRISING A PRINT HEAD

(71) Applicant: BYFLOW B.V., Eindhoven (NL)

(72) Inventors: Floris Petran Hoff, Eindhoven (NL); Stefan Cornelis Gerardus Dorssers, Panningen (NL)

(73) Assignee: BYFLOW B.V., Eindhoven (NL)

( * ) Notice: Subject to any disclaimer, the term of this patent is extended or adjusted under 35 U.S.C. 154(b) by 846 days.

(21) Appl. No.: 16/488,747

(22) PCT Filed: Mar. 12, 2018

(86) PCT No.: PCT/NL2018/050149
§ 371 (c)(1),
(2) Date: Aug. 26, 2019

(87) PCT Pub. No.: WO2018/169389
PCT Pub. Date: Sep. 20, 2018

(65) Prior Publication Data
US 2020/0045990 A1    Feb. 13, 2020

(30) Foreign Application Priority Data
Mar. 13, 2017    (NL) .................................... 2018501

(51) Int. Cl.
*A23G 1/20*    (2006.01)
*A23P 20/20*    (2016.01)
(Continued)

(52) U.S. Cl.
CPC .............. *A23G 1/206* (2013.01); *A23P 20/20* (2016.08); *A23P 2020/253* (2016.08);
(Continued)

(58) Field of Classification Search
CPC ... B29C 64/295; B29C 64/209; B29C 64/106; B29C 48/911; B29C 48/87; A23G 1/206;
(Continued)

(56) References Cited

U.S. PATENT DOCUMENTS 4,460,398 A * 7/1984 Sasaki ...................... C03B 5/26
65/327
4,886,440 A * 12/1989 Forrest .................... A23P 30/10
425/208
(Continued)

FOREIGN PATENT DOCUMENTS

CN    104642684 A  *  5/2015
CN    104824302 A     8/2015
(Continued)

OTHER PUBLICATIONS

English translation of CN-206119034-U by EPO (OA Appendix). (Year: 2017).*
(Continued)

*Primary Examiner* — Timothy Kennedy
*Assistant Examiner* — Inja Song
(74) *Attorney, Agent, or Firm* — Suiter Swantz IP

(57) ABSTRACT

The invention relates to a print head comprising a nozzle for printing a food product layer-by-layer and a conveyor for conveying food. The invention further relates to a system comprising such a print head and a container containing food in solid state and having a supply line for providing food in solid state to the reservoir of the print head.

14 Claims, 4 Drawing Sheets

(51) Int. Cl.
*A23P 20/25* (2016.01)
*A23P 30/20* (2016.01)
*B29C 64/106* (2017.01)
*B29C 64/209* (2017.01)
*B33Y 30/00* (2015.01)

(52) U.S. Cl.
CPC .............. *A23P 30/20* (2016.08); *B29C 64/106* (2017.08); *B29C 64/209* (2017.08); *B33Y 30/00* (2014.12)

(58) Field of Classification Search
CPC .... A23P 20/20; A23P 30/20; A23P 2020/253; B33Y 30/00
See application file for complete search history.

(56) References Cited

U.S. PATENT DOCUMENTS

| | | |
|---|---|---|
| 2003/0129921 A1 | 7/2003 | Small et al. |
| 2006/0214335 A1* | 9/2006 | Cox ................. B29C 64/357 425/375 |
| 2008/0213419 A1* | 9/2008 | Skubic ............... B29C 48/865 415/72 |
| 2011/0223293 A1* | 9/2011 | Cousin ............... B29C 48/92 426/231 |
| 2012/0018924 A1* | 1/2012 | Swanson ............. B33Y 30/00 264/401 |
| 2012/0251688 A1 | 10/2012 | Zimmerman et al. |
| 2012/0251689 A1* | 10/2012 | Batchelder .......... A23G 3/0242 99/450.1 |
| 2015/0097053 A1* | 4/2015 | Batchelder ............ B33Y 30/00 239/135 |
| 2015/0245632 A1 | 9/2015 | Mantell et al. |
| 2016/0324206 A1* | 11/2016 | Bunker .................. A23G 9/28 |
| 2017/0295816 A1* | 10/2017 | Wang ................... B33Y 30/00 |

FOREIGN PATENT DOCUMENTS

| | | | |
|---|---|---|---|
| CN | 105167131 A | * 12/2015 | |
| CN | 206119034 U | * 4/2017 | |
| CN | 106626352 A | * 5/2017 | ............. B33Y 30/00 |
| WO | 2014/190168 A1 | 11/2014 | |
| WO | 2014/190217 A1 | 11/2014 | |

OTHER PUBLICATIONS

English translation of CN-104642684-A by EPO (OA Appendix). (Year: 2015).*
English translation of CN-105167131-A by EPO (OA Appendix). (Year: 2015).*
English translation of CN-106626352-A by EPO. (Year: 2017).*
International Search Report for International Application No. PCT/NL2018/050149 mailed on May 18, 2018.

* cited by examiner

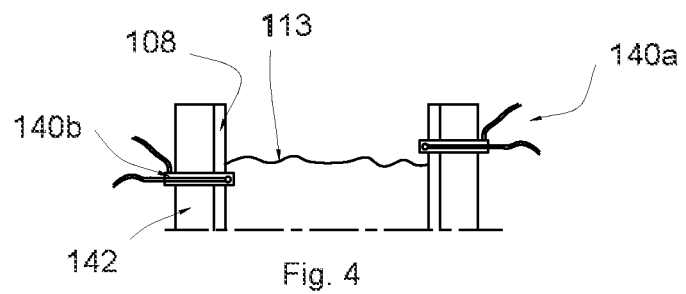

PRINT HEAD FOR PRINTING A FOOD PRODUCT LAYER-BY-LAYER AND A SYSTEM COMPRISING A PRINT HEAD

TECHNICAL FIELD AND BACKGROUND

The invention relates to a print head comprising a nozzle for printing a food product layer-by-layer and a conveyor for conveying food.

The invention further relates to a system for printing a food product comprising a print head.

Such a print head and system are known from US2012/0251688. The details of the known print head can be seen in FIG. 5 of this patent document. The known print head comprises a flow channel for receiving chocolate in liquid state, an auger pump and an extrusion tip. This arrangement of the print head allows chocolate in liquid state to flow through the flow channel, wherein a portion of the chocolate material may enter the auger pump to be driven and extruded from the extrusion tip, i.e. the nozzle. The extruded chocolate can be deposited to provide a chocolate confection in a layer-by-layer manner. The remaining unused chocolate may flow around auger pump and out of the flow channel into a recirculation loop. The known print head is part of an additive manufacturing system. This known system comprises a reservoir connected to the print head by means of conduits and a pump. The reservoir is configured to provide flowable chocolate.

The distance between the reservoir for preparing the chocolate and the print head is relatively large. This distance may negatively influence the quality of the flowable chocolate such that without additional temperature control measures the flowable chocolate prepared in the reservoir may become less flowable and/or the stability of the crystal structure of the flowable chocolate to be printed may decrease.

BRIEF SUMMARY

It is an object of the present invention to provide an improved print head. In particular, it is an object of the present invention to provide an improved print head being capable of printing a food product in an efficient manner.

This object is achieved with the print head disclosed in claim 1.

The print head comprises a nozzle for printing a food product layer-by-layer and a conveyor for conveying food from a reservoir forming part of the printhead to the nozzle, wherein the reservoir comprises at least one heating unit for melting solid food to be received in the reservoir and the reservoir further comprises an exit near or in the bottom of the reservoir for conveying melted food over a travel path by means of the conveyor from the reservoir to the nozzle. The reservoir of the print head is configured to receive food in solid state. The print head is suitable for printing a chocolate confection and the food to be received in the reservoir of the print head is chocolate, for example chunks of chocolates or chocolate granules. Supplying food in a solid state to the print head is possible, because the reservoir forms a part of the print head, i.e. in an assembled state the reservoir, the conveyor section comprising the conveyor and the nozzle form a single unit. After receiving the solid food, for example the chocolate granules, the reservoir prepares and melts the food by means of the heating unit to render the food flowable. The distance between the internal reservoir of the print head and the nozzle is relatively short compared to the distance between a print head and an external reservoir to prepare flowable chocolate as known from the prior art. The distance is defined by the travel path inside the print head between the exit and the nozzle. By means of the travel path it is possible to prepare and deliver the food to the nozzle for printing in an compact and efficient manner, because after melting the food temperature control including cooling may be required along the travel path to the nozzle to achieve and/or to maintain the desired preparation process, in case of chocolate to achieve and/or to maintain the desired temper of the chocolate to print a chocolate confection with no or minimal blooming. By means of the travel path in the print head in combination with the conveyor, preferably a screw conveyor, the conditions of the process to prepare the food can be controlled. For chocolate, the stability of the crystal structure of the flowable chocolate can be controlled accurately in the travel path. In this way it is possible to provide a chocolate confection having an attractive aesthetic appearance with no or minimal blooming effect.

In addition, The solid food to be supplied to the print head requires no or only minimal treatment, in particular no thermal treatment of the food to be supplied to the reservoir is required such that the food can be delivered to the print head in an energy efficient and cost friendly manner.

In one aspect of the print head the center of the conveyor may coincide with the center of the exit and/or the center of the nozzle may coincide with the center of the exit. In this way a single straight travel path can be achieved between the exit of the reservoir and the nozzle which facilitates a constant product flow through the nozzle and facilitates temperature control of the food in the travel path to control the process, i.e. for chocolate to increase or to maintain the stability of the crystal structure of the chocolate.

In one other aspect, the print head comprises a processor unit controlling the heating unit and/or a temperature controller arranged adjacent the travel path. In this way it is possible that the heating unit heats the reservoir dependent on the input received by the processor regarding the type of food, the volume of the food, the ambient temperature, or the feedback received from sensors measuring the state of the food in the reservoir and/or in the travel path, etcetera. Dependent on the input signals received by the processor unit, the processor unit controls the heating unit and/or the temperature controller arranged adjacent the travel path to provide food to the nozzle in the best condition for printing to obtain a food product having an attractive aesthetic appearance.

In the print head the food conveyed by the conveyor between the exit and the nozzle can be conditioned by means of at least one temperature controller arranged adjacent the travel path, wherein the temperature controller may comprise sections along the travel path and each section can be controlled independently with respect to a different section to provide different temperature zones in the travel path. In this way the desired temperature process for a specific product can be achieved and/or maintained accurately. For chocolate the desired temper process can be achieved and/or maintained accurately in the print head having these different temperature sections.

The print head may comprise at least one heat exchanger. The temperature controller may comprise the heat exchanger such that it is possible to bring the food flowing through the travel path at the desired temperature. The print head is in particular suited for printing a confection from sugar containing food such as for example caramel or chocolate. The print head may also be used for printing a food product from a fat and/or protein containing food, such as dairy.

Advantageous aspects of the print head are further specified in the dependent claims.

It is a further object of the present invention to provide an improved system for printing a food product. In particular, it is an object of the present invention to provide a system being capable of printing a food product in an efficient manner.

This object is achieved with the system disclosed in the appended system claims.

The additive manufacturing system for printing a food product comprises a print head as described in this document and a container for containing food in solid state and having a supply line for providing the food in solid state to the reservoir of the print head. The container does not form part of the print head and is spaced from the print head, i.e. the print head and the container are two spaced components of the system. The container is preferably positioned such that it is easily accessible for an operator, for example for refilling the container. The supply line may comprises a hose or a pipe to transport the solid food such as chocolate, preferably chocolate granules, from the container to the reservoir, preferably the hose or the pipe is flexible and/or provided with a screw conveyor (not shown). In this way the reservoir can be continuously supplied with substantially equal portions of solid food. The solid food in the container may be in the form of granules or powder or chunks, i.e. pieces of solid food being stamped/crushed to a volume of less than one cubic centimetre. The food chunks or granules may have a uniform size to facilitate a constant melting process in the reservoir by means of the heating unit.

For printing the product food on a platform by means of the print head, the system further comprises a drive system to move the print head in multiple directions and/or to move a platform for carrying the food product in multiple directions.

BRIEF DESCRIPTION OF THE DRAWINGS

The invention will now be explained in more detail with reference to the drawings and by means of a description of an exemplary embodiment of a print head and a system, wherein:

FIG. 4 shows a portion of a reservoir of a print head with sensors therein.

DETAILED DESCRIPTION

Figure 1:
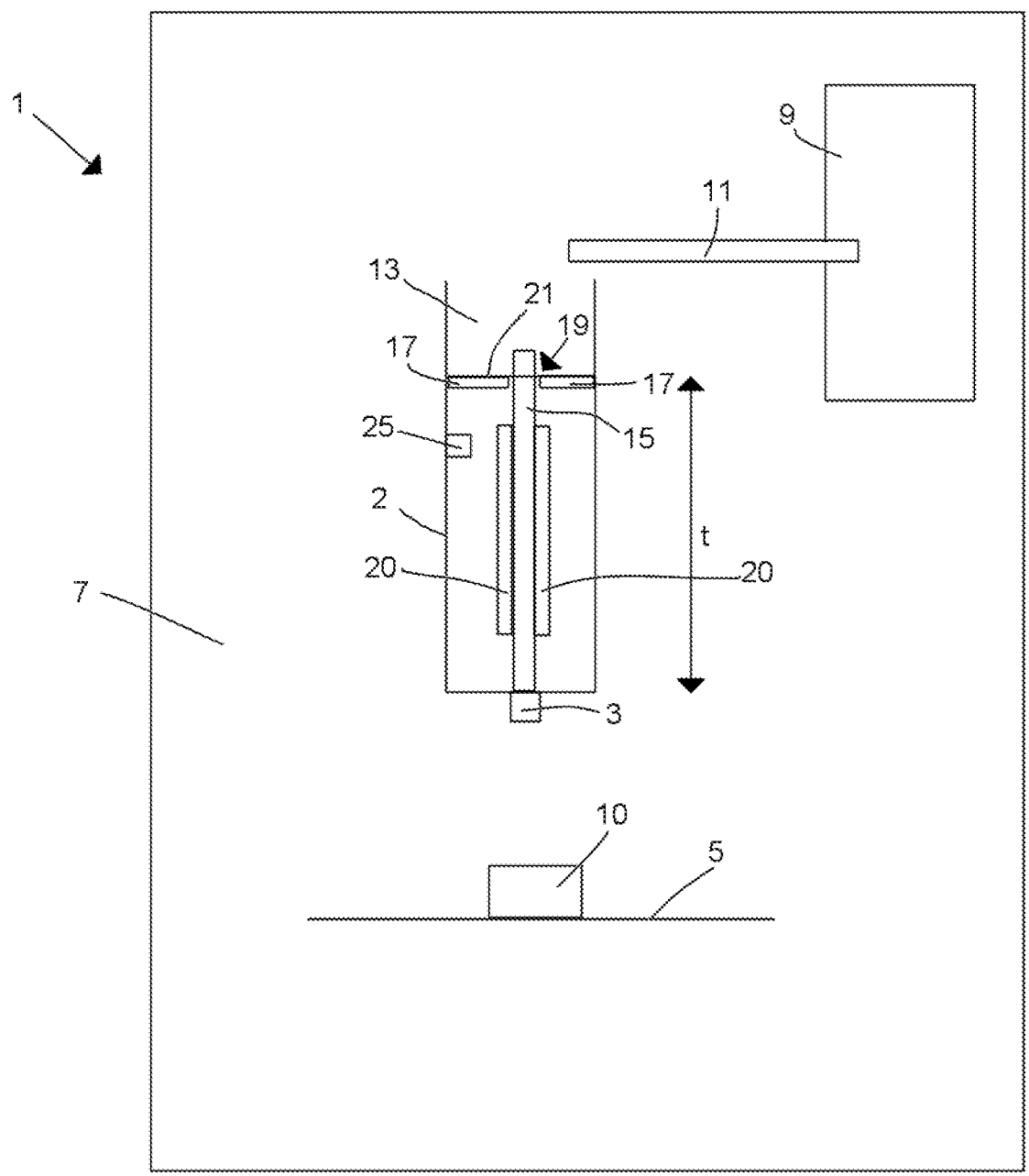
FIG. 1 shows a schematic front view of a system for printing a food product, in particular chocolate confection.

In the following description identical or corresponding parts have identical or corresponding reference numerals.

FIG. 1 shows a schematic view of an additive manufacturing system 1 for printing a customized chocolate confection 10 on a platform 5 by means of a print head 2 with a nozzle 3. A number of components such as for example a drive system are not shown in FIG. 1 for clarity of illustration. However, a drive system is part of the system 1 and comprises a drive controller (processor) and a memory to be loaded with instructions for printing the chocolate confection 10. The drive controller controls drives for moving the print head 2 and/or the platform 5 to print custom-designed chocolates. The print head 2 and the platform 5 are moveable relative to each other based on signals from the drive controller. For example, the platform 5 may be moved along the vertical z-axis with use of a first drive, and the print head 2 may be moved in the horizontal x-y plane with the use of a second drive. Other configurations of the drives are also possible, for example drives for moving the print head 2 and/or the platform 5 in three directions (x-y-z).

The system 1 comprises a chamber 7 that can be opened and closed preferably in an airtight manner for providing a clean working environment.

The system 1 further comprises a container 9 for containing chocolate in solid state (not shown). The container 9 has a supply line 11 for providing the chocolate in solid state to a reservoir 13 of the print head 2.

The container 9 does not form part of the print head 2 and is spaced from the print head 2, i.e. the print head 2 and the container 9 are two spaced components of the system 1 that are connected with each other by means of the supply line 11. The container 9 is preferably positioned such that it is easily accessible for an operator, for example for refilling the container 9. The solid chocolate is discharged from the container 9 via the supply line 11 to the reservoir 13. Hence, the container 9 may have a relatively simple design/construction, i.e. no agitating means and/or heating elements are required in the container 9, because the chocolate received in the container 9 can be discharged from the container 9 without processing.

The supply line 11 may comprises a hose or a pipe to transport the solid chocolate, preferably chocolate granules, from the container 9 to the reservoir 13. The hose or the pipe can be flexible and can be provided with a screw conveyor (not shown). In this way the reservoir 13 can be continuously supplied with substantially equal portions of solid chocolate. The solid chocolate in the container 9 may be in the form of granules or powder or chunks, i.e. pieces of solid chocolate being stamped/crushed to a volume of less than one cubic centimetre. For dosing the solid chocolate, it is advantageous if the pieces of solid chocolate have an uniform size, i.e. have approximately the same size. A uniform size of the chocolate chunks/granules also facilitates the controllability of the melting process of the chocolate. Further, as the chocolate is supplied in solid state to the reservoir 13, the supply line 11 can be relatively long without any risk that the quality of the chocolate deteriorates. Further, no additional measures such as for example heating need to be taken in the supply line 11 to deliver the chocolate in solid state to the reservoir 13. It is also possible that the inlet of the supply line 11 is located closer to or in the bottom of the container 9 than shown in FIG. 1.

The print head 2 shown in FIG. 1 comprises the nozzle 3 and a conveyor 15 for conveying chocolate from the reservoir 13 to the nozzle 3.

The reservoir 13 comprises a heating unit 17 provided in the bottom 21 of the reservoir 13 for melting solid chocolate to be received in the reservoir 13. It is also possible to provide heating elements (not shown) of heating unit 17 in the sidewalls of the reservoir 13. The reservoir 13 further comprises an exit 19 in the bottom 21 of the reservoir 13 for discharging melted chocolate from the reservoir 13 into a travel path by means of the conveyor 15 from the reservoir 13 to the nozzle 3. The reservoir 13 forms part of the print head 2 and is integrated therein such that the volume of the reservoir 13 is located in the interior of the print head 2. A high degree of efficiency can be obtained using such an integrated design of the reservoir 13 of the print head 2 because after melting, the flowable chocolate is directly conveyed over a travel path with length t inside the print head 2 to the nozzle 3. The distance defined by the travel path between the exit 19 and the nozzle 3 is smaller than 30 cm, preferably smaller than 20 cm.

The print head 2 further comprises a processor unit 25 controlling the heating unit 17 and/or a temperature controller 20 arranged adjacent the travel path. In the travel path the chocolate, molten in the reservoir 13 and discharged through the exit 19, is conveyed by means of the conveyor 15 to the nozzle 3. The temperature controller 20 controls a tempering process of the chocolate along the travel path, preferably over more than 50% of the length t of the travel path.

Figure 2:
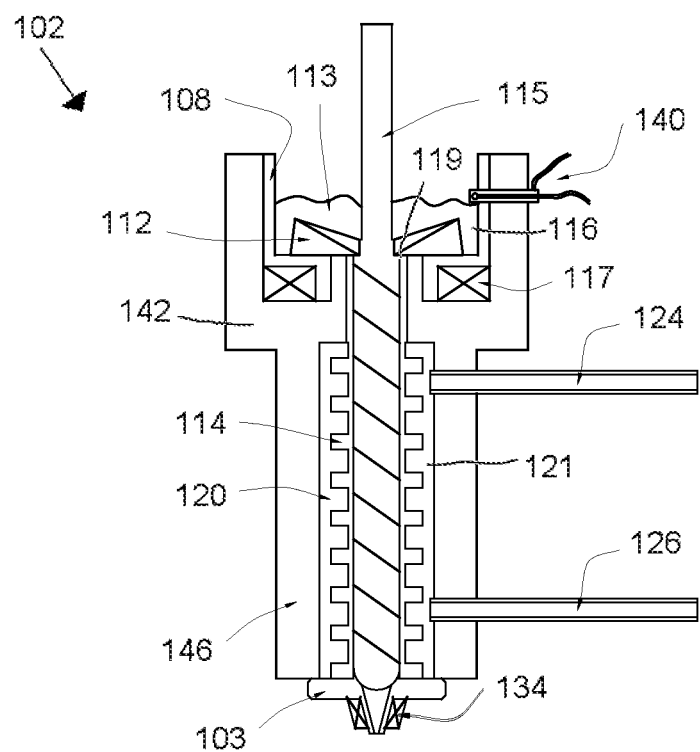
FIG. 2 show a cross section of a first embodiment of a print head.

FIG. 2 shows a first embodiment of the print head 102 comprising a reservoir 113, a nozzle 103, a screw conveyor 115 and a travel path around the screw conveyor 115 extending between the exit 119 and the nozzle 103. By means of the conveyor 115 chocolate molted in the reservoir 113 is supplied to the nozzle 103. The nozzle 103 comprises a nozzle heating 134 to heat the chocolate to the desired temperature before depositing the chocolate on a platform. By means of the screw conveyor 115 the residence time of the flowable chocolate in the travel path can be controlled.

The reservoir 113 is a bath 108 for melting the solid chocolate supplied by supply line (not shown in FIG. 2). The bath 108 is an open top reservoir such that solid chocolate can be easily supplied from above. The bath 108 further comprises a closed side wall and a bottom with an exit 119. In use of the print head 102, chocolate can only be discharged from the bath 108 through the exit 119. The exit 119 is the inlet of travel path towards the nozzle 103. The volume of the reservoir 113/bath 108 to prepare flowable chocolate is approximately 0.1-0.2 dm$^3$.

The chocolate 116 inside the bath 108 is heated by means of a heating unit 117 comprising a heating coil to prepare a flowable chocolate 7. The reservoir 113 further comprises at least one mixer 112 which is configured to agitate and/or apply shear to the chocolate for bringing the chocolate in liquid state. Further, the reservoir 113 comprises at least one sensor 140 for detecting the amount of chocolate in the reservoir 113, such that it is possible to supply more or less solid chocolate to the bath 108 depending on the amount of chocolate in the bath 108 and the desired amount of chocolate in the bath 108. The supply of solid chocolate can be automatically controlled by means of the sensor 140. The single sensor 140 may detect a temperature difference when the sensor 140 is in contact with the air or the chocolate which provides an indication of the chocolate volume inside the bath 108.

The temperature controller 120 of the print head 102 comprises a heat exchanger 121, which is positioned along the conveyor screw 115 to control the temperature of the chocolate flowing through reservoir exit 119 into the travel path. The heat exchanger 121 comprises a supply 124 of coolant (cool liquid) and a discharge line 126 for circulating liquid through the heat exchanger to temper the chocolate conveyed by the conveyor 115 in the travel path. The heat exchanger 121 also comprises a wall 114 surrounding the screw conveyor 115. The wall 114 may be made of a heat conducting material for example a metal.

As shown in FIG. 2 the bath 108 of the reservoir 113 is surrounded by a part of the housing 146 of the print head, preferably the upper part 142 of the housing 146 of the print head. The housing 146 is made of a thermally isolating material to provide a print head 102 that can be operated in an energy efficient manner.

For optimal flow and optimal temperature control, the center of the conveyor 115 coincides with the center of the exit 119 and the center of the nozzle 103 coincides with the center of the exit 119. In this construction of the print head 102 it is possible that the upper part of the screw conveyor 115 extends through the exit 119 into the reservoir 113.

Generally, the chocolate is first heated in the bath 108 by means of the heating unit 117 to approximately 45° C. to melt all six forms of crystals of the chocolate. Next, the chocolate flows throught the exit 119 of the bath 108 into the travel path such that the chocolate is cooled to about 27° C. which will allow crystal types IV and V to form. At this temperature, the chocolate is conveyed and agitated by means of the conveyor 115 to create small crystals in the chocolate. The chocolate is then heated to about 31° C. by means of the nozzle heating 134 of the nozzle 103 to eliminate any type IV crystals, leaving just type V. After this point, the chocolate is in a perfect condition to be printed for providing a chocolate confection with no or minimal blooming. Other methods of chocolate tempering may also be used. In or close to the nozzle 103 the temper of chocolate can be measured with a chocolate temper meter (not shown) to ensure accuracy and consistency.

Figure 3:
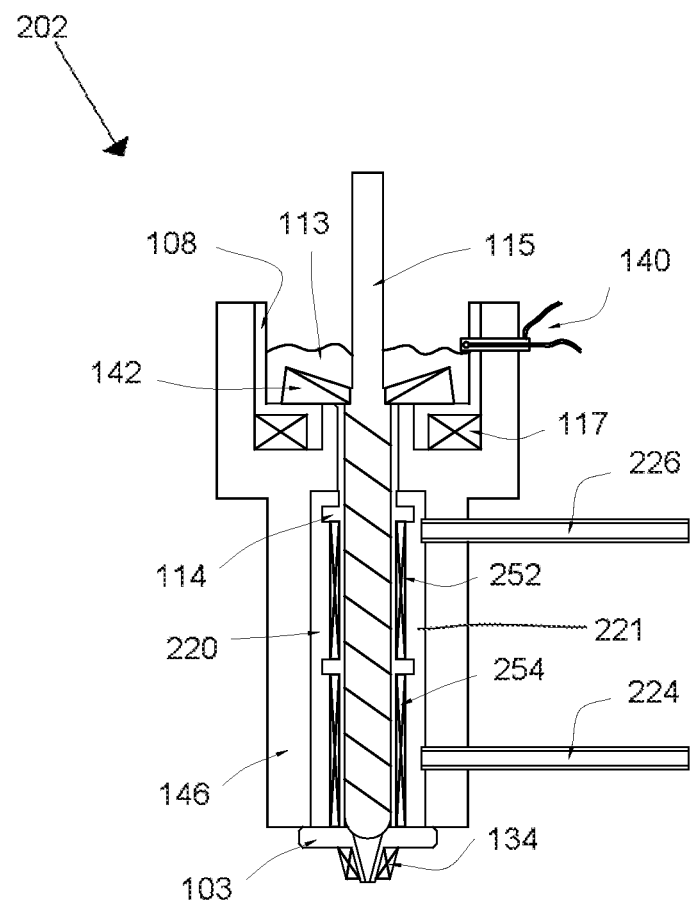
FIG. 3 shows a cross section of a second embodiment of a print head.

FIG. 3 illustrates a further embodiment of the print head 202 which substantially has the same components as the first embodiment of the print head 102 as shown in FIG. 2. Therefore, identical parts have been provided with the same reference signs and will not be explained in any more detail here. However, the print head 202 differs from the print head 102 in that the print head 202 has a different temperature controller 220.

The temperature controller 220 comprises a heat exchanger 221 and two heating coils 252, 254 which are spaced apart in the longitudinal direction of the travel path. The chocolate conveyed by the conveyor 115 between the exit 119 and the nozzle 10 can be conditioned by means of the heat exchanger 221 and/or the temperature controller 220 arranged adjacent travel path. The heating coils 252, 254 provide sections, i.e. an upper section and a lower section. The temperature in the upper section around the heating coil 252 can be controlled independently with respect to the temperature in a lower section around the heating coil 254 such that it is possible to provide different temperature zones in the travel path to further optimize the temper process of the chocolate. The heat exchanger 221 comprises a supply 224 of coolant (cool liquid) and a discharge line 226 for circulating liquid through the heat exchanger.

FIG. 4 shows an alternative sensor arrangement of the reservoir 113. This sensor arrangement comprises two sensors 140a, 140b which are arranged at different heights with respect to the bottom of the bath 108, i.e. sensor 140a is arranged higher than sensor 140b. If the chocolate level in the bath is higher than sensors 140a, 140b, sensors 140a, 140b provide a positive signal to a processor (not shown) of the system that no more solid chocolate should be supplied to the reservoir 113. If the chocolate level is between the two sensors 140a, 140b as shown in FIG. 4, than the sensor 140a sends a negative signal to the processor and the sensor 140b sends a positive signal. The processor may now continue the supply of solid chocolate to maintain the chocolate level constant or if the printing process is finished may stop the supply of chocolate. If the chocolate level in the bath is lower than sensors 140a, 140b, sensors 140a, 140b provide a negative signal to a processor (not shown) of the system that more solid chocolate should be supplied to the reservoir 113 unless the printing process has finished.

The figures show a print head and a system for preparing a chocolate confection. However, it is also possible to use the print head and the system for preparing a food product such as a confection, for example a caramel confection. It is further possible to use the print head and the system in combination with fat and/or protein containing food, such as dairy.

The invention claimed is:

1. A print head, comprising:
a nozzle configured to print a food product layer-by-layer;
a nozzle heater configured to heat the nozzle to thermally condition melted food product to reach a desired temperature before depositing the melted food product;
a reservoir integrally formed with the print head, the reservoir including at least one heating unit configured to melt solid food product to be received in the reservoir, and the reservoir further including an exit positioned in a bottom of the reservoir;
a screw conveyor configured to convey the melted food product from the exit to the nozzle;
a travel path positioned radially outward and around the screw conveyor, the travel path extending from the exit to the nozzle;
a temperature controller positioned adjacent the travel path for thermally conditioning the melted food product as the melted food product is conveyed along the travel path, the temperature controller comprising:
a heat exchanger comprising:
  a heat conducting metal wall positioned radially outward of the screw conveyor and extending along an upper section and a lower section of the travel path; and
  a supply line and a discharge line for circulating fluid through the heat exchanger:
a first heating coil positioned radially outward of the heat conducting metal wall and extending along the upper section of the travel path; and
a second heating coil positioned radially outward of the heat conducting metal wall and extending along the lower section of the travel path;
wherein the first and second heating coils are spaced apart in a longitudinal direction of the travel path and extend longitudinally coextensive with the heat conducting metal wall; and
a processor unit configured to control:
a temperature of the at least one heating unit of the reservoir; and
the temperature controller to control a temperature of the heat exchanger and to independently control a temperature of the first heating coil and a temperature of the second heating coil.

2. The print head according to claim 1, wherein a center of the screw conveyor coincides with a center of the exit.

3. The print head according to claim 1, wherein a center of the nozzle coincides with a center of the exit.

4. The print head according to claim 1, wherein the screw conveyor extends at least partly through the exit.

5. The print head according to claim 1, wherein the reservoir further includes at least one mixer configured to at least one of agitate and apply shear to the food product in the reservoir.

6. The print head according to claim 1, wherein the reservoir further includes at least one sensor configured to sense an amount of the food product in the reservoir.

7. The print head according to claim 1, further comprising a housing made of thermally isolating material, the housing containing the reservoir, the screw conveyor, the travel path, and the temperature controller.

8. The print head according to claim 1, wherein a top of the reservoir is open to receive the food product from above.

9. The print head according to claim 1, wherein a volume of the reservoir is no more than 1 dm$^3$.

10. The print head according to claim 1, wherein a distance between the exit and the nozzle is less than 30 cm.

11. The print head according to claim 1, wherein the nozzle is configured to print a confection.

12. The print head according to claim 1, wherein the food product configured to be printed by the nozzle contains at least one of fat and protein.

13. The print head according to claim 1, wherein the temperature controller extends more than 50% of a length of the travel path.

14. The print head according to claim 1, wherein the processor is configured to control the temperature of the at least one heating unit of the reservoir, and the temperature controller to control the temperature of the heat exchanger and to independently control the temperature of the first heating coil and the temperature of the second heating coil, to temper the melted food product as the melted food product is conveyed along the travel path.

* * * * *